(No Model.)
L. T. SCOFIELD.
VALVE OPERATING MECHANISM.
No. 317,217. Patented May 5, 1885.
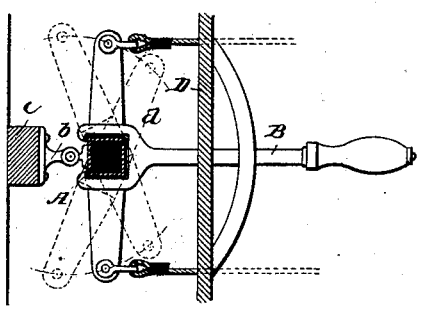
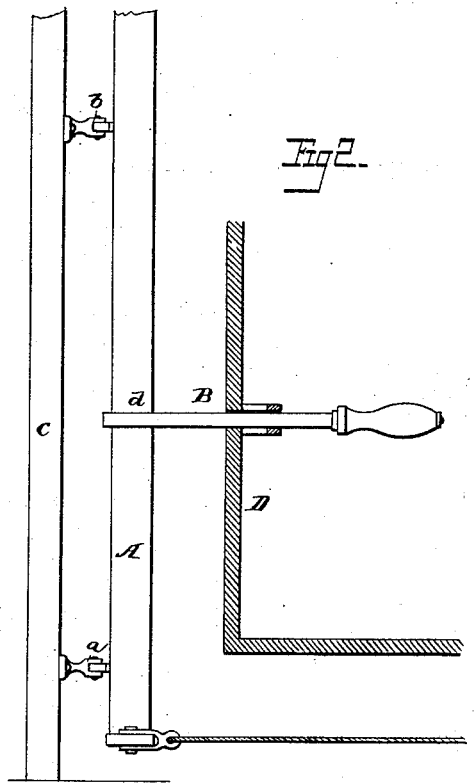
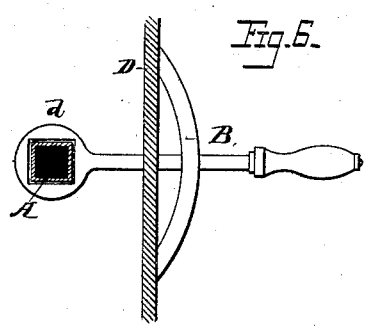
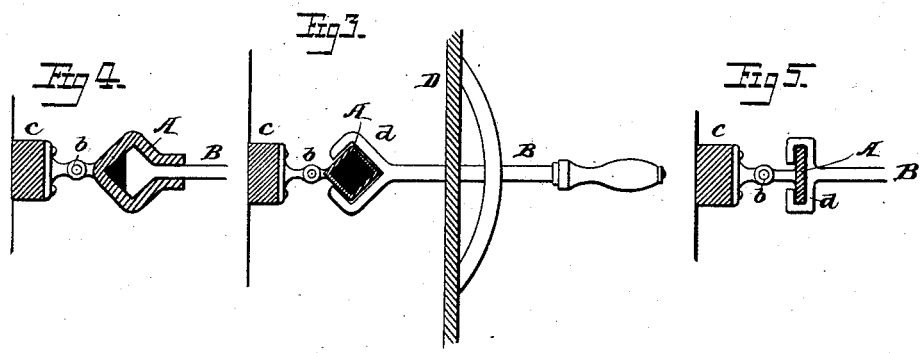
Attests:
John G. Hinkel Jr.
W. H. Dunn
Inventor:
Levi T. Scofield

UNITED STATES PATENT OFFICE.

LEVI T. SCOFIELD, OF CLEVELAND, OHIO, ASSIGNOR TO THE HYDRAULIC ELEVATOR COMPANY, OF CHICAGO, ILLINOIS.

VALVE-OPERATING MECHANISM.

SPECIFICATION forming part of Letters Patent No. 317,217, dated May 5, 1885.

Application filed March 30, 1885. (No model.)

*To all whom it may concern:*

Be it known that I, LEVI T. SCOFIELD, a citizen of the United States, residing at Cleveland, in the county of Cuyahoga and State of Ohio, have invented certain new and useful Improvements in Valve-Operating Mechanism, of which the following is a specification.

My invention relates to that class of elevators in which the stopping and starting devices are operated from the cage through the medium of a vertically-suspended shaft or bar and a handle having a sliding connection with the shaft and extending into the cage; and my invention consists in supporting the said shaft and connecting the sliding handle thereto in such manner as to avoid the objections incident to the employment of the usual terminal supports for the shaft.

In the drawings, Figure 1 is a sectional plan showing part of an elevator-cage, shaft, and operating-handle, and illustrating my improvement. Fig. 2 is a side view of the parts represented in Fig. 1, the cage in section. Figs. 3, 4, and 5 are sectional plans illustrating modifications. Fig. 6 is a sectional plan illustrating the ordinary mode of constructing and connecting the handle and shaft.

In that class of elevators in which the stopping and starting valve or other appliance is operated from the cage through the medium of a vertical shaft or bar and a handle sliding upon said shaft and extending into the cage, the shaft has been supported upon trunnions or bearings at the opposite ends, such supports being necessary because of the fact that the end of the handle incloses the shaft, preventing the application of supports or bearings at points between the ends. The form of the handle thus employed is shown in Fig. 6. This ordinary mode of support is objectionable because of the weight on the bearings and of the necessity of making the shaft of sufficient size and stiffness to prevent it from bending between its supports. To overcome these objections I provide the shaft A with a series of bearings at one side, and use a handle of such construction that while it may slide upon and is retained in connection with the said shaft it will not make contact with any of the bearings.

The character of the bearings which I prefer to employ is illustrated in the drawings, and consists in providing the shaft with lugs *a*, which are pivoted or hinged to brackets *b*, bolted to the inner wall of the well or to a strip, *c*, secured thereto, whereby the shaft is supported at suitable intervals throughout its entire length, and will swing upon the said pivots to take the different positions shown in full and dotted lines, Fig. 1.

The handle B may be constructed in different ways, so as to slide with the cage and yet remain in connection with the shaft, to permit the latter to be moved from within the cage. Thus the handle may be provided with a forked end or head, the prongs of which extend around the opposite sides of a shaft pivoted at one side, as shown in Figs. 1 and 2; or the prongs may extend to opposite sides of a shaft pivoted at one edge, as shown in Fig. 3; or the shaft may be hollow, with a slot along its length, through which slot the handle extends, the head of the handle being within the shaft, as shown in Fig. 4. Whatever may be the form of connection adopted between the shaft and the handle, it should be such that the handle extending through a slot projecting from the cage D will remain in engagement with the shaft, and will serve as a means of swinging the latter while sliding upon the shaft, but without making contact with the bearings or pivotal connections thereof.

The shaft is provided at its lower end with a cross-bar, *h*, from which ropes are extended to the operating lever or levers, or other suitable connections are employed, whereby the starting and stopping valve or other device is operated upon the turning or swinging of the shaft.

It will be evident that as the shaft A can be supported at close intervals throughout its entire length it may be made of much lighter material, and may be much more effectively preserved in line than if it had merely terminal supports. It will also be evident that the shaft may be hollow, so as form a continuous tube, as shown in Figs. 1 to 3, or a slotted tube, as shown in Fig. 4; or it may be a solid bar angular in cross-section—as, for instance, a T-rail, as shown in Fig. 5.

Without limiting myself to the precise construction and arrangement of parts shown and described, I claim—

1. The combination, with an elevator-cage, of a vertical shaft pivoted at intervals along one side to brackets or bearings, and a handle extending from the cage to said shaft and constructed to slide upon and turn with the shaft without contact with the connections between the latter and its supports, substantially as described.

2. The combination of the vertical shaft hung to bearings at one side and connected to the stopping and starting mechanism of an elevator, with the elevator-cage and a handle extending from the cage to the shaft and fitted to slide and turn with the latter without contact with the bearings of the shaft, substantially as described.

3. The combination, with the elevator-cage and vertical shaft connected to the starting and stopping devices and suspended to supports at one side, of a handle extending from the cage and provided with forks gripping the shaft, substantially as and for the purpose set forth.

In testimony whereof I have signed my name to this specification in the presence of two subscribing witnesses.

LEVI T. SCOFIELD.

Witnesses:
W. H. DUNN,
WM. M. SCOFIELD.